(12) United States Patent
Ramirez et al.

(10) Patent No.: US 6,253,310 B1
(45) Date of Patent: Jun. 26, 2001

(54) DELAYED DEALLOCATION OF AN ARITHMETIC FLAGS REGISTER

(75) Inventors: Ricardo Ramirez, Cupertino; Mike Morrison, Santa Clara, both of CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/224,621

(22) Filed: Dec. 31, 1998

(Under 37 CFR 1.47)

(51) Int. Cl.⁷ ............... G06F 15/00; G06F 9/38
(52) U.S. Cl. .............. 712/218; 712/23; 712/234
(58) Field of Search .............. 712/23, 217, 218, 712/219, 225, 234, 209, 221

(56) References Cited

U.S. PATENT DOCUMENTS

| | | | |
|---|---|---|---|
| 5,446,912 | * | 8/1995 | Colwell et al. ............... 712/217 |
| 5,481,693 | * | 1/1996 | Blomgren et al. ............ 712/225 |
| 5,488,730 | * | 1/1996 | Brown, III et al. ............ 712/41 |
| 5,638,525 | * | 6/1997 | Hammond et al. ........... 712/209 |
| 5,802,340 | * | 9/1998 | Mallick et al. ............... 712/218 |
| 6,047,369 | * | 4/2000 | Colwell et al. ............... 712/217 |
| 6,061,777 | * | 5/2000 | Cheong et al. ............... 712/23 |
| 6,098,168 | * | 8/2000 | Eisen et al. .................. 712/218 |
| 6,170,052 | * | 1/2001 | Morrison ..................... 712/236 |

FOREIGN PATENT DOCUMENTS

WO 00/07097 * 2/2000 (WO).

* cited by examiner

*Primary Examiner*—Larry D. Donaghue
(74) *Attorney, Agent, or Firm*—Schwegman, Lundberg, Woessner & Kluth

(57) ABSTRACT

A microprocessor capable of delaying the deallocation of an arithmetic flags register is described. A system processes instructions of a first instruction set architecture which has an arithmetic flags register. The system also processes instructions of a second instruction set architecture which is not compatible with the first instruction set architecture. In order to process a first instruction of the first instruction set architecture that implicitly updates the arithmetic flags register, the arithmetic flags register shares a physical destination register with a general register containing a result for the first instruction. An instruction that does not update the arithmetic flags but would deallocate the register containing the arithmetic flags triggers the delayed deallocation mechanism of the present invention.

12 Claims, 17 Drawing Sheets

| AFFECT OF INSTRUCTION ON ARITHMETIC FLAGS REGISTER | DELAY DEALLOCATE OF PREVIOUS ARITHMETIC FLAGS REGISTER |
|---|---|
| EXPLICIT UPDATE | NO |
| IMPLICIT DATE | NO |
| DOES NOT UPDATE AND DOES NOT DEALLOCATE REGISTER | NO |
| DOES NOT UPDATE AND DEALLOCATES REGISTER | YES |

| AFFECT OF INSTRUCTION ON ARITHMETIC FLAGS REGISTER | DELAY DEALLOCATE OF PREVIOUS ARITHMETIC FLAGS REGISTER |
|---|---|
| EXPLICIT UPDATE | NO |
| IMPLICIT DATE | NO |
| DOES NOT UPDATE AND DOES NOT DEALLOCATE REGISTER | NO |
| DOES NOT UPDATE AND DEALLOCATES REGISTER | YES |

FIG. 5

| INSTRUCTION | UPDATE | UPDATE TO AFLAGS | NEW PHYSICAL DESTINATION | OLD PHYSICAL DESTINATION | AFLAGS | EBX | ECX | EFLAGS | REGISTER TO DEALLOCATE | DELAY DEALLOCATION? |
|---|---|---|---|---|---|---|---|---|---|---|
| INSTRUCTION 1 | EBX <-- | IMPLICIT | 61 | 53 | 61 | 61 | 49 | 33 | 53 | NO |
| INSTRUCTION 2 | ECX <-- | IMPLICIT | 50 | 49 | 50 | 61 | 50 | 33 | 49 | NO |
| INSTRUCTION 3 | ECX <-- | NONE | 94 | 50 | 50 | 61 | 94 | 33 | 50 | YES |
| INSTRUCTION 4 | ECX <-- | NONE | 80 | 94 | 50 | 61 | 80 | 33 | 94 | NO |
| INSTRUCTION 5 | EBX <-- | IMPLICIT | 42 | 61 | 42 | 42 | 80 | 33 | 61 | NO |
| INSTRUCTION 6 | EBX <-- | NONE | 63 | 42 | 42 | 63 | 80 | 33 | 42 | YES --> DEALLOCATE 50 |
| INSTRUCTION 7 | EFLAGS <-- | EXPLICIT | 73 | 33 | 73 | 63 | 80 | 73 | 33 | NO |
| INSTRUCTION 8 | EBX <-- | IMPLICIT | 56 | 63 | 56 | 56 | 80 | 73 | 63 | NO |
| INSTRUCTION 9 | EBX <-- | NONE | 67 | 56 | 56 | 67 | 80 | 73 | 56 | YES --> DEALLOCATE 42 |

FIG. 8

DELAYED DEALLOCATION OF AN ARITHMETIC FLAGS REGISTER

FIELD

The present invention is related to processors, and more particularly to register management in processors.

BACKGROUND INFORMATION

The function of a processor, such as a microprocessor, is to execute programs. Programs comprise a group of instructions. Each instruction is broken down into one or more operations known as micro-operations (referred to herein as "uops"). Processors execute uops by reading operands from one or more source registers and storing results in one or more destination register. A register is a temporary storage area within a processor for holding arithmetic and other results used by the processor. Registers are individually comprised of bits. A bit is a binary digit and represents either a "0" value or a "1" value. Different registers may be used for different functions. For example, general purpose registers are used interchangeably to hold operands for logical and arithmetic operations. Special purpose registers may be used for holding status information via various flag bits, for example.

The term "IA-32" refers to a well known instruction set utilized by an Intel® architecture family of processors, e.g. the Pentium® II microprocessor and the Pentium® Pro microprocessor, manufactured by Intel Corporation. IA-32 defines a special purpose register called an EFLAGS register. The EFLAGS register comprises a 32-bit flag register which holds a group of status flags, control flags, and system flags. FIG. 1 is a diagram of the EFLAGS register. As shown in FIG. 1, the status flags are indicated by an "S," the control flag is indicated by a "C," and the system flags are indicated by an "X." The status flags contained in the EFLAGS register allow the results of one instruction to influence later instructions. The status flags (also called arithmetic flags) include a carry flag at bit "0", a parity flag at bit "2", an auxiliary carry flag at bit "4", a zero flag at bit "6", a sign flag at bit "7", a trap flag at bit "8", and an overflow flag at bit "11". The control flag contained in the EFLAGS register controls string instructions. The control flag of the EFLAGS register is stored at bit "10" as shown in FIG. 1. The system flags of the EFLAGS register control input/output, maskable interrupts, debugging, task switching and enabling of virtual 8086 execution. The system flags are stored in the EFLAGS register at bits "9," "12," "14," "16" and "17" as shown in FIG. 1.

Traditionally, a processor had a single instruction set, such as the IA-32 instruction set, for example. Typically, the processor could only accept operating systems and application programs in that instruction set. If a processor architecture and the instruction set are fundamentally altered, the processor is no longer capable of executing an existing software base of operating systems and application programs. As a result, fundamental changes, and therefore, major advances in processor architecture and instruction sets, have not been possible where compatibility with a previous instruction set is a desired design objective.

However, U.S. Pat. No. 5,638,525, ('525 patent) assigned to Intel Corporation, describes a processor architecture capable of accepting multiple operating systems and application programs using different instruction sets. This architecture allows a first program using a first instruction set to execute concurrently with a second program using a different instruction set that is not compatible with the first instruction set. One specific embodiment shown in the '525 patent comprises a microprocessor that can accept both a 32 bit instruction set and a 64 bit instruction set.

The term "compatible" as used herein refers to the ability of an instruction of one instruction set architecture to operate with a different instruction set architecture. For example, the instruction may be from a previous version of the instruction set architecture. In order to provided an improved processor architecture and instruction set while at the same time maintaining compatibility to a previous instruction set, it is desirable to reduce the hardware dedicated to the previous instruction set. The new hardware (such as the execution units and the register set) is used as much as possible to support the previous instruction set.

In order for a processor capable of accepting multiple instruction sets to accept both the IA-32 instruction set or the like and a second instruction set which is not compatible to the IA-32 instruction set or the like, it is desirable that the processor be able to manage the information contained in the IA-32 instruction set EFLAGS register or the like in a manner that is compatible with the second instruction set. If the second instruction set lacks an equivalent to the EFLAGS register or if the second instruction set experiences a significant performance penalty by maintaining the EFLAGS register or a portion of the EFLAGS register in the same manner as provided for by the IA-32 instruction set, then it may not be desirable for the processor to execute an existing software base of operating systems and application programs utilizing the IA-32 bit instruction set or the like.

Accordingly, there is a need for methods and corresponding designs to provide compatibility for the Intel® 32-bit architecture processor instruction set or the like in a multi-instruction set processor architecture.

SUMMARY

According to one aspect of the present invention, a system of the present invention processes instructions of a first instruction set architecture which has an arithmetic flags register.

The system also processes instructions of a second instruction set architecture which is not compatible with the first instruction set architecture. In order to process a first instruction of the first instruction set architecture that implicitly updates the arithmetic flags register, the arithmetic flags register shares a physical destination register with a general register containing a result for the first instruction. An instruction that does not update the arithmetic flags but would deallocate the register containing the arithmetic flags triggers the delayed deallocation mechanism of the present invention.

Still other and further embodiments, aspects and advantages of the invention will become apparent by reference to the drawings and by reading the following detailed description.

BRIEF DESCRIPTION OF THE DRAWINGS

FIG. 5 is a table summarizing when deallocation of a physical register containing the arithmetic flags is to be delayed.

FIGS. 7A, 7B, 7C, 7D, 7E, 7F, 7G, 7H, 7I, and 7J illustrate a data flow example for an example sequence of instructions that perform operations on logical registers according to the present invention.

FIG. 8 is a table summarizing the sequence of instructions shown in FIGS. 7A, 7B, 7C, 7D, 7E, 7F, 7G, 7H, 7I, and 7J.

DETAILED DESCRIPTION

Figure 1:
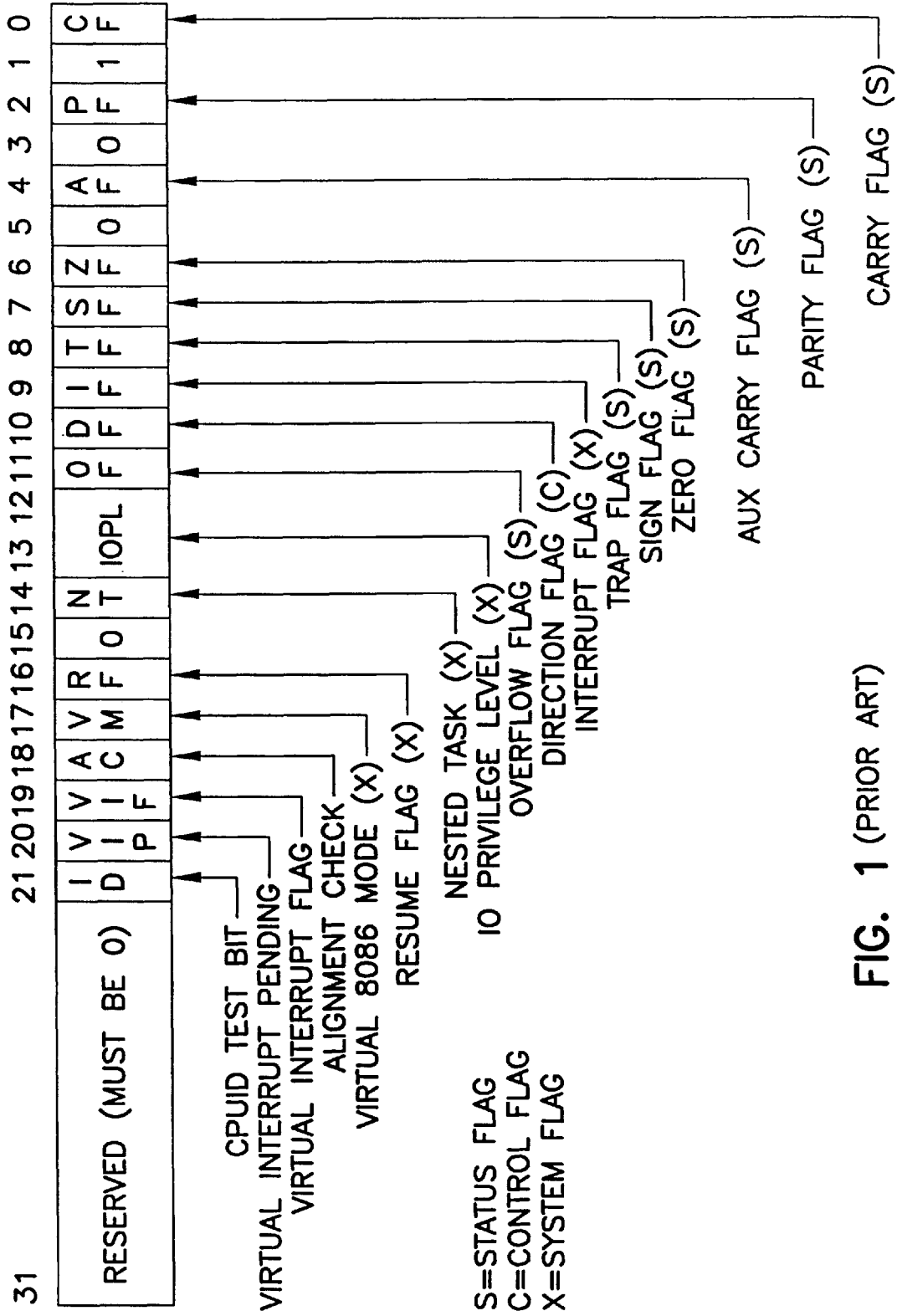
FIG. 1 a block diagram of an EFLAGS register.

A novel processor capable of delaying the deallocation of an arithmetic flags register is described. In the following detailed description of embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed description which follow are presented in terms of algorithms and symbolic representations of operations on data bits within a system. These algorithmic descriptions and representations are the means used by those skilled in the processor arts to most effectively convey the substance of their work to others skilled in the art. An algorithm is here, and generally, conceived to be a self-consistent sequence of operations leading to a desired result. The operations are those employing physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments of the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A delayed deallocation mechanism of the present invention provides an apparatus and method for maintaining arithmetic flags of one instruction set in a multi-instruction set architecture. The term "deallocation" is used in the context of register renaming in a processor. The term refers to the deallocation of a physical register that corresponds to a logical register. When a physical register is deallocated, the physical register is made available to store data for another operation. In one embodiment, the delayed deallocation mechanism provides a mechanism to indicate when a physical register contains valid arithmetic flags and to delay deallocation of the physical register when a subsequent instruction that does not update the arithmetic flags would otherwise deallocate the register containing the valid arithmetic flags. Thus, by delaying deallocation of the physical register containing valid arithmetic flags, the arithmetic flags are preserved until the arithmetic flags are updated by a further subsequent instruction and stored in a different physical register.

Figure 2:
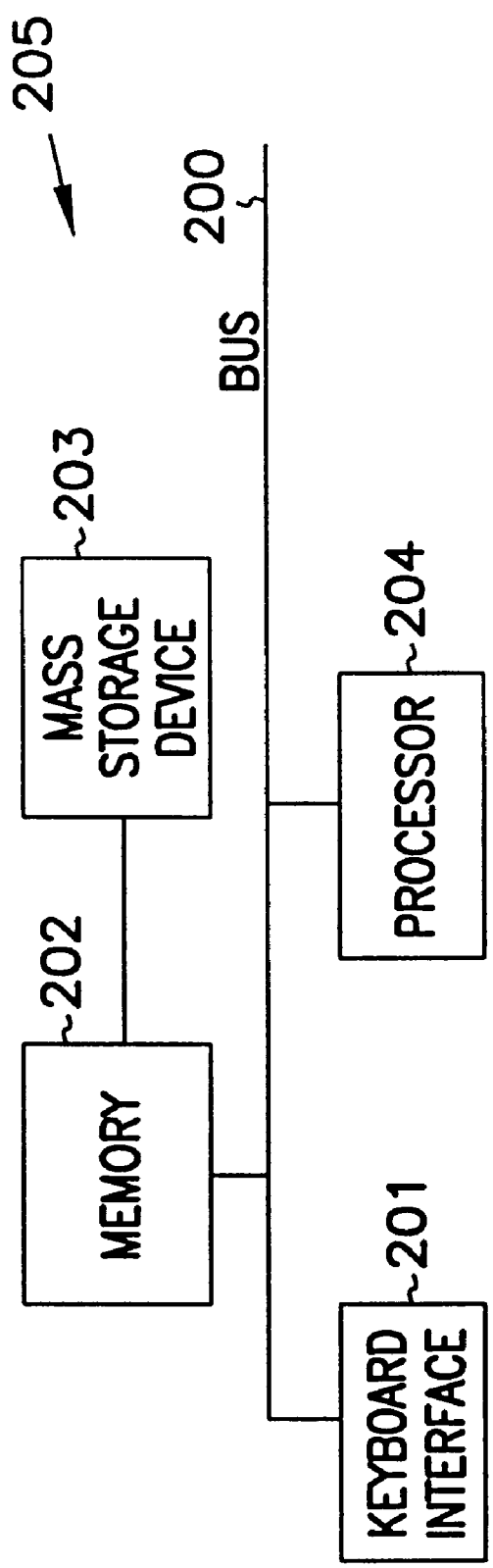
FIG. 2 is a block diagram of an example embodiment of a system according to the present invention.

System. FIG. 2 is a block diagram of a system, such as a computer system 205, of an example embodiment of the present invention. The computer system 205 comprises bus 200, keyboard interface 201, external memory 202, mass storage device 203 and processor 204. Bus 200 may be a single bus or a combination of multiple buses. Bus 200 provides communication links between components in the system. Keyboard interface 201 may be a dedicated device or may reside in another device such as a bus controller or other controller. Keyboard interface 201 allows coupling of a keyboard to the system and transmits signals from a keyboard to the system. External memory 202 may comprise a dynamic random access memory (DRAM) device, a static random access memory (SRAM) device, or other memory devices. External memory 202 stores information from mass storage device 203 and processor 204 for use by processor 204. Mass storage device 203 may be a hard disk drive, a floppy disk drive, a CD-ROM device, or a flash memory device. Mass storage device 203 provides information to external memory 202.

Processor 204 is capable of decoding and executing computer programs such as an application program or an operating system with instructions from multiple instruction sets. Processor 204 includes logic for a delayed deallocation mechanism of the present invention. The processor 204 may be compatible with, but not limited to, microprocessors such as an Intel® architecture microprocessor, manufactured by Intel Corporation of Santa Clara, Calif., the assignee of the present invention. In alternate embodiments, the processor 204 may be compatible with a PowerPC™ architecture microprocessor, an Alpha™ architecture microprocessor, and the like.

In one embodiment, the processor 204 of the present invention is designed to operate as a high performance superscalar processor which means that more than one uop executes per clock cycle. The processor 204 is also capable of executing uops out-of-order when the case allows. Out-of-order processing within the processor 204 involves allowing instructions to be processed out of their original program order to gain performance and increase parallelism and efficient resource usage. True data dependent instructions are not executed out-of-order, but often many instructions within a program order do not directly depend on the results of earlier instructions. These instructions may be processed out-of-order if the processor 204 contains sufficient resources.

The processor 204 of the present invention also has the ability to execute speculatively. This means that the front end of the processor 204 may take a guess on the pathway of a program code at a particular branch instruction and may follow and execute a program path that should or should not actually be executed depending on the accuracy of the predicted branch. Until the processor 204 actually determines that the front end predicted the right pathway, each instruction and uop executed and processed by the processor 204 after encountering the branch instruction will be speculative. Speculative instructions are not allowed to update certain portions of the processor 204 that hold "real results" or architecturally visible results which represent results of nonspeculative instructions. If the front end of the processor 204 took the correct path then the speculative instructions "retire" and their results may be updated into the architecturally visible portions of the processor 204. If the front end of the processor 204 predicted the wrong pathway, then the results of the speculative instructions are purged and the processor 204 is set along the correct pathway. Therefore, reference to an instruction "retiring" means that an instruction or uop has been determined to be nonspeculative and will actually update the architecturally visible portions of the processor. In one embodiment, the processor 204 of the present invention is pipelined.

Figure 3:
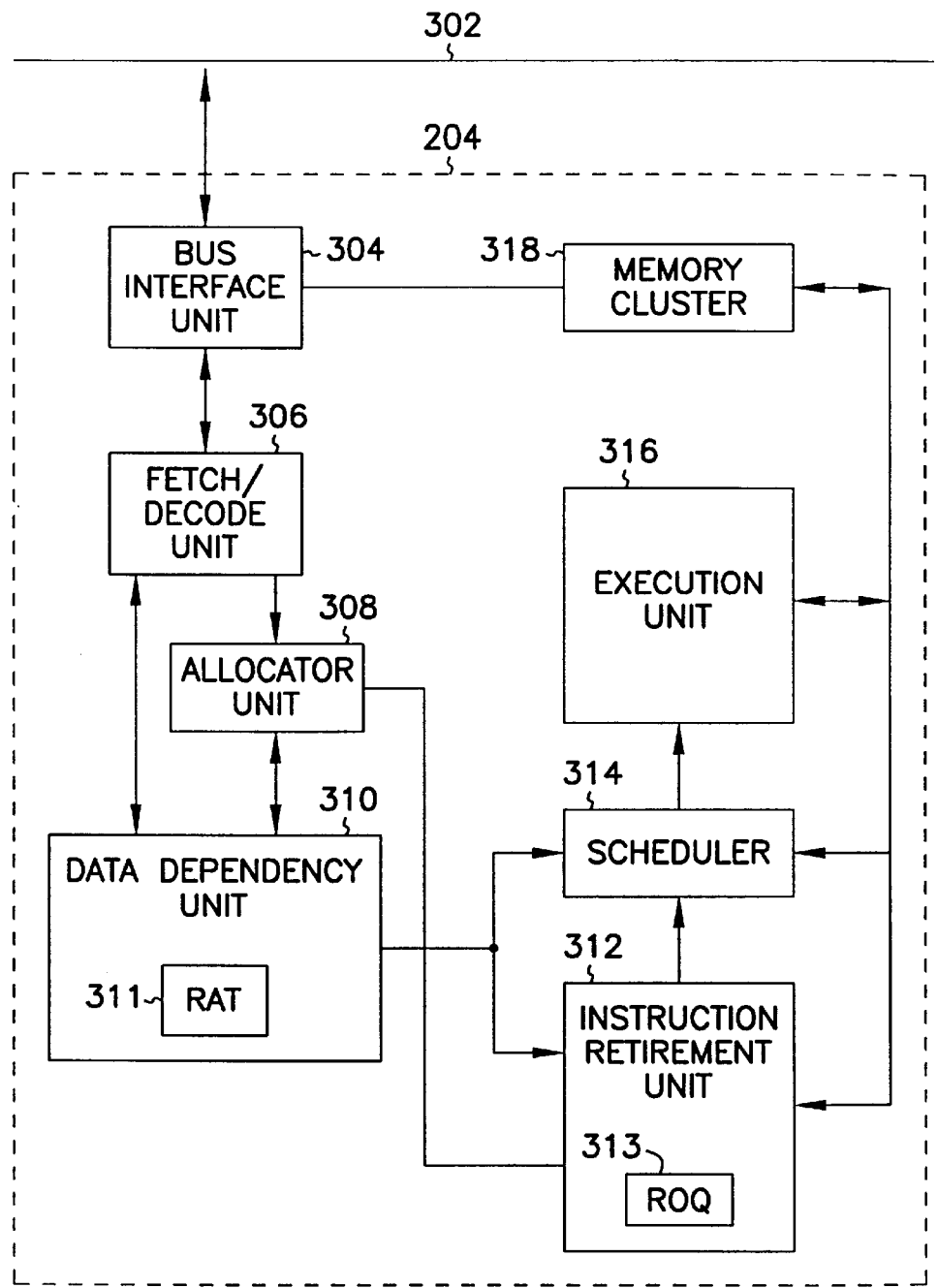
FIG. 3 is a functional block diagram of an example embodiment of a processor such as the processor shown in FIG. 2.

FIG. 3 is a functional block diagram of an example microprocessor embodiment of the processor 204 shown in FIG. 2. The example microprocessor embodiment 204 comprises a memory cluster 318, a bus interface unit 304, an instruction fetch/decode unit 306, an allocator unit 308, a data dependency unit 310, an instruction retirement unit 312, a scheduler 314, and one or more execution units 316.

The memory cluster 318 provides a memory subsystem for the processor 204. The bus interface unit 304 provides an interface for operations external to microprocessor embodiment 204. Instructions to be executed and data for processing are supplied over bus 302 to the bus interface unit 304. The bus interface unit 304 transfers instructions to an instruction fetch and decode unit 306.

The instruction fetch and decode unit 306 fetches an instruction from memory or a known storage location and decodes the instruction into one or more operations known as micro-instructions (also referred to herein as "uops"). A description of the precise operation of the instruction fetch/decode unit 306 is not necessary for a full understanding of the present invention. Any well known instruction fetch and decode unit 306 may be used. It is sufficient to note that the instruction fetch/decode unit 306 fetches the instructions of a program in program code order, decodes these instructions, and isolates the logical source registers and logical destination register for each uop. In one embodiment, logical source and destination registers are those registers of the Intel architecture register set, e.g., EAX, EBX, ECX, AH, BH, DI, EDI, and so on. The uops and their associated logical registers are supplied by the instruction fetch and decode unit 306 to a data dependency unit 310 and an allocator unit 308.

The allocator unit 308 supplies the data dependency unit 310 with a list of pointers that represent available physical registers. In one embodiment, the physical registers reside in the instruction retirement unit 312. However, in alternate embodiments, the physical registers reside in other units. A description of the precise operation of the allocator unit 308 is not required for a full understanding of the delayed deallocation mechanism. It is sufficient to note that the allocator 308 supplies the data dependency unit 310 with a list of vacant physical registers for use by a current set of uops.

The data dependency unit 310 renames logical registers to a larger set of physical registers that reside in an instruction retirement unit 312 and are used by one or more execution units 316. In one embodiment, the data dependency unit 310 maintains a register alias table (RAT) 311. The RAT 311 is used for renaming logical registers that are supplied by the instruction fetch/decode unit 306 of the example microprocessor embodiment 204. The renaming process involves converting logical register identifiers into physical register identifiers. For each one of the source registers for an operation, a logical register identifier is converted into a physical register identifier. Also, for the destination register for the operation, a new physical register identifier is assigned to the logical register identifier. The data dependency unit 310 is coupled to an instruction retirement unit 312 which holds the physical registers and also to a scheduler 314. The data dependency unit 310 includes a mechanism for maintaining an arithmetic flags registers as further described below.

The scheduler 314 receives the operands for a given uop after the operands have been renamed to physical registers. The scheduler 314 dispatches a particular uop to an appropriate one of the execution units 316 when the uop is ready to execute and when an execution unit is available for use.

The execution unit 316 executes the uops. In one embodiment, the execution unit 316 is superscalar. The superscalar execution unit contains multiple arithmetic logic units (ALUs). The execution unit 316 also supports the out-of-order execution and speculative execution. Source data for the execution unit 316 originates from the reorder queue (ROQ) 313.

The instruction retirement unit 312 contains the physical registers and instruction execution status information in a reorder queue (ROQ) 313 or the like. In an embodiment that executes speculatively, such as the example microprocessor embodiment 204, a uop may initially be speculative. The data contained in the reorder queue for a speculative uop is not architecturally visible. This is the case because the microprocessor embodiment is not sure that it went down the correct program path and therefore the data may not be valid. However, as soon as the microprocessor embodiment determines that the correct program path was predicted, data is not speculative any longer and may be retired. It is appreciated that the example microprocessor embodiment 204 does not necessarily execute uops in program code order, however, executed uops are retired in program code order in this embodiment. As uops are retired, the instruction retirement unit 312 identifies physical registers in the reorder queue 313 that are no longer being used. The physical registers that are no longer being used are deallocated and the allocator unit 308 uses the free physical registers for the renaming of other logical registers. However, the delayed deallocation mechanism of the present invention delays the deallocation of a physical register in the reorder queue 313 which contains valid arithmetic flags as further described below.

Delayed Deallocation Mechanism. In one embodiment, a delayed deallocation mechanism of the present invention provides an apparatus for maintaining arithmetic flags of one instruction set in a multi-instruction set architecture. The microprocessor embodiment 204 of FIG. 3 is capable of decoding and executing computer programs, such as an application program or an operating system with instructions from multiple instruction sets. In order for the microprocessor embodiment 204 to accept both uops from a first instruction set architecture having an arithmetic flags register and uops from a second instruction set which is not compatible with the first instruction set, the microprocessor embodiment 204 must manage the status information contained in the arithmetic flags register of the first instruction set in a manner that is compatible with the second instruction set. The term "arithmetic flags" is used herein to refer to status flags, such as the status flags contained in the IA-32 EFLAGS register as shown in FIG. 1, or the like.

Figure 4:
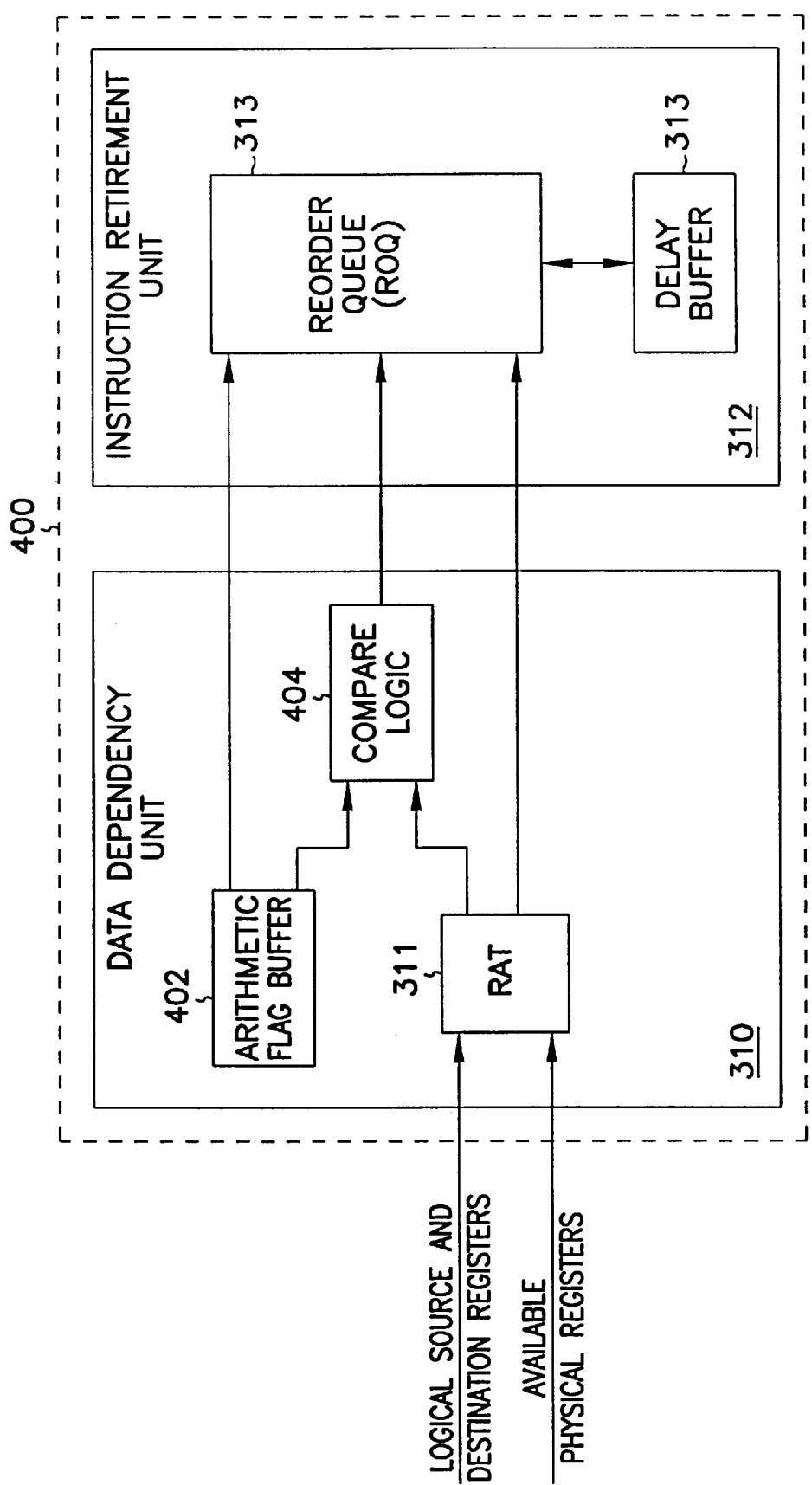
FIG. 4 is a block diagram of one embodiment of a delayed deallocation mechanism of the ) microprocessor of FIG. 3.

FIG. 4 is a block diagram of one embodiment of a delayed deallocation mechanism of the microprocessor embodiment 204 of FIG. 3. In one embodiment, the delayed deallocation mechanism 400 comprises a data dependency unit 310 and an instruction retirement unit 312.

The data dependency unit 310 comprises a register alias table (RAT) 311, an arithmetic flag buffer 402 and compare logic 404. The RAT 311 renames logical registers for IA-32 instructions and the like. The RAT 311 also identifies instructions that update the arithmetic flags register.

The arithmetic flag buffer 402 contains a pointer to a physical register containing an architecturally valid state of the arithmetic flags register. As shown in FIG. 4, the arithmetic flag buffer 402 is separate from the RAT 311. However, alternate embodiments in which the arithmetic flag buffer 402 is maintained in the RAT 311 are contemplated as within the scope of the invention.

The instruction retirement unit 312 maintains a reorder queue (ROQ) 313. The ROQ 313 comprises a plurality of physical registers. Each one of the physical registers that is associated with a logical register contains a first entry to indicate when the physical register is shared by a general logical register and the arithmetic flags register. Each one of the physical registers also contains a second entry to indicate if the deallocation of physical register is to be delayed in order to preserve the arithmetic flags. In an alternate embodiment, the ROQ 313 is organized as a First In/First Out (FIFO) queue in sequential order of the uops. In one embodiment, a delay buffer 410 contains a pointer to a register whose deallocation is being delayed.

A first entry and a second entry in the reorder queue 313 are used to identify and preserve a physical register containing the arithmetic flags. In an example embodiment, each register in the reorder queue has a first entry to indicate when the register contains the arithmetic flags. In one embodiment, the first entry is a bit referred to herein as an "AF" bit. Each register in the reorder queue also has a second entry to indicate that the deallocation of the register is to be delayed until a subsequent instruction updates the arithmetic flags. In one embodiment, the second entry is a bit referred to herein as a "DD" bit.

When an instruction does not update the arithmetic flag but would deallocate the register containing the valid arithmetic flags, then the delayed deallocation mechanism of the present invention is triggered. The delayed deallocation of the physical destination register containing the arithmetic flags is accomplished by compare logic 404 comparing the physical register currently assigned the arithmetic flags with a previous physical destination register of a logical register that is being renamed to a new physical destination register. If the compare logic 404 indicates that the physical register containing the current state of the arithmetic flags is the physical register that will be deallocated when the logical register is renamed, an entry is set in the reorder queue 313 to indicate that the physical register containing the current state of the arithmetic flags is to be preserved rather than being deallocated upon retirement and returned to the available register pool. In one embodiment, a match is signaled by setting the "DD" bit in the ROQ 313. The physical register is preserved until a subsequent instruction updates the arithmetic flags and thus moves the arithmetic flags to a different physical register. In one embodiment, the result of this compare operation is a "don't care" condition for all instructions except the instructions that trigger the delayed deallocation mechanism of the present invention.

FIG. 5 is a table summarizing when deallocation of a physical register containing the arithmetic flags is to be delayed. An instruction may explicitly update the arithmetic flags, implicitly update the arithmetic flags, or leave the arithmetic flags unaffected. The affect of an instruction on the arithmetic flags determines whether or not to delay the deallocation of a physical register containing a current state of the arithmetic flags.

As shown in FIG. 5, when an instruction explicitly updates the arithmetic flags, the deallocation of the previous register containing the arithmetic flags is not delayed. An explicit update to the arithmetic flags register occurs when a uop specifies the arithmetic flags register as the logical destination register. Instructions that explicitly update the arithmetic flags generate new arithmetic flags and thus the previous register containing the arithmetic flags can be deallocated because the previous register no longer contains the current state of the arithmetic flags. In one embodiment, the RAT 311 renames a logical arithmetic flag register that is an explicit destination of an instruction to a physical destination register. When the instruction retires, the physical destination register assigned to a previous instruction that also explicitly updated the arithmetic flags is deallocated.

Also as shown in FIG. 5, when an instruction implicitly updates the arithmetic flags, the deallocation of the previous register containing the arithmetic flags is not delayed. An implicit update occurs when instruction updates the arithmetic flags register and a second logical register simultaneously. An instruction that implicitly updates the arithmetic flags register does not specify the arithmetic flags register as the logical destination register; instead, a general register is usually specified as the logical destination register. For example, implicit updates occur as a side-effect of many arithmetic logic unit (ALU) operations. In one embodiment, the RAT 311 interprets an instruction that implicitly updates that arithmetic flags so that the arithmetic flags are stored in the same physical destination register as the logical destination register for the instruction. Thus, two logical registers (the arithmetic flags register and a general purpose register) are allowed to share the same physical register in the ROQ 313. Instructions that implicitly update the arithmetic flags generate new arithmetic flags and thus the previous register containing the arithmetic flags no longer contains the current state of the arithmetic flags. When the instruction retires, the previous physical register assigned to the logical destination register is deallocated. In an example embodiment which integrates the arithmetic flags portion of the IA-32 EFLAGS register with a second 64 bit instruction set, implicit updates to the arithmetic flags are stored in an upper 32 bits of a 64-bit physical destination register for the second instruction set in the ROQ 313.

However, not all instructions update the arithmetic flags. In the case of an instruction that does not update the arithmetic flags, the RAT does not rename the arithmetic flags register. Rather, the arithmetic flags remain in the old physical destination register. This complicates the deallocation of the old physical destination register since the register still holds valid information—the current state of the arithmetic flags. To solve this problem, the delayed deallocation mechanism provides a mechanism to indicate when a physical register contains valid arithmetic flags and to delay deallocation of the physical register when a subsequent instruction that does not update the arithmetic flags would deallocate the register containing the valid arithmetic flags. Thus, by delaying deallocation of the physical register containing valid arithmetic flags, the arithmetic flags are preserved until the arithmetic flags are updated by a further subsequent instruction and stored in a different physical register.

As shown in FIG. 5, when an instruction does not update the arithmetic flags and also does not deallocate the physical register containing the arithmetic flags, the delayed deallocation mechanism is not triggered because the register containing the arithmetic flags will not be deallocated.

However, when an instruction does not update the arithmetic flags (which would move the arithmetic flags to a new physical register) but the instruction would deallocate the register containing the arithmetic flags, the delayed deallocation mechanism of the present invention is triggered. Deallocation of the register containing valid arithmetic flags would occur in this case because the operation renames a logical destination register that is the same as the logical destination register of the last instruction to update the arithmetic flags. According to the present invention, though, deallocation of the physical register containing the arithmetic flags is delayed until the arithmetic flags are updated by a subsequent instruction and thus renamed to a different physical register. When the instruction retires, instead of deallocating the physical register containing the arithmetic flags, the previous physical destination register for which deallocation was delayed is deallocated. In the embodiment shown in FIG. 4, the delay buffer 410 contains a pointer to the previous physical destination register for which deallocation was delayed.

As indicated above, the affect of an instruction on the arithmetic flags determines whether or not to delay the deallocation of a physical register containing a current state of the arithmetic flags.

Figure 6:
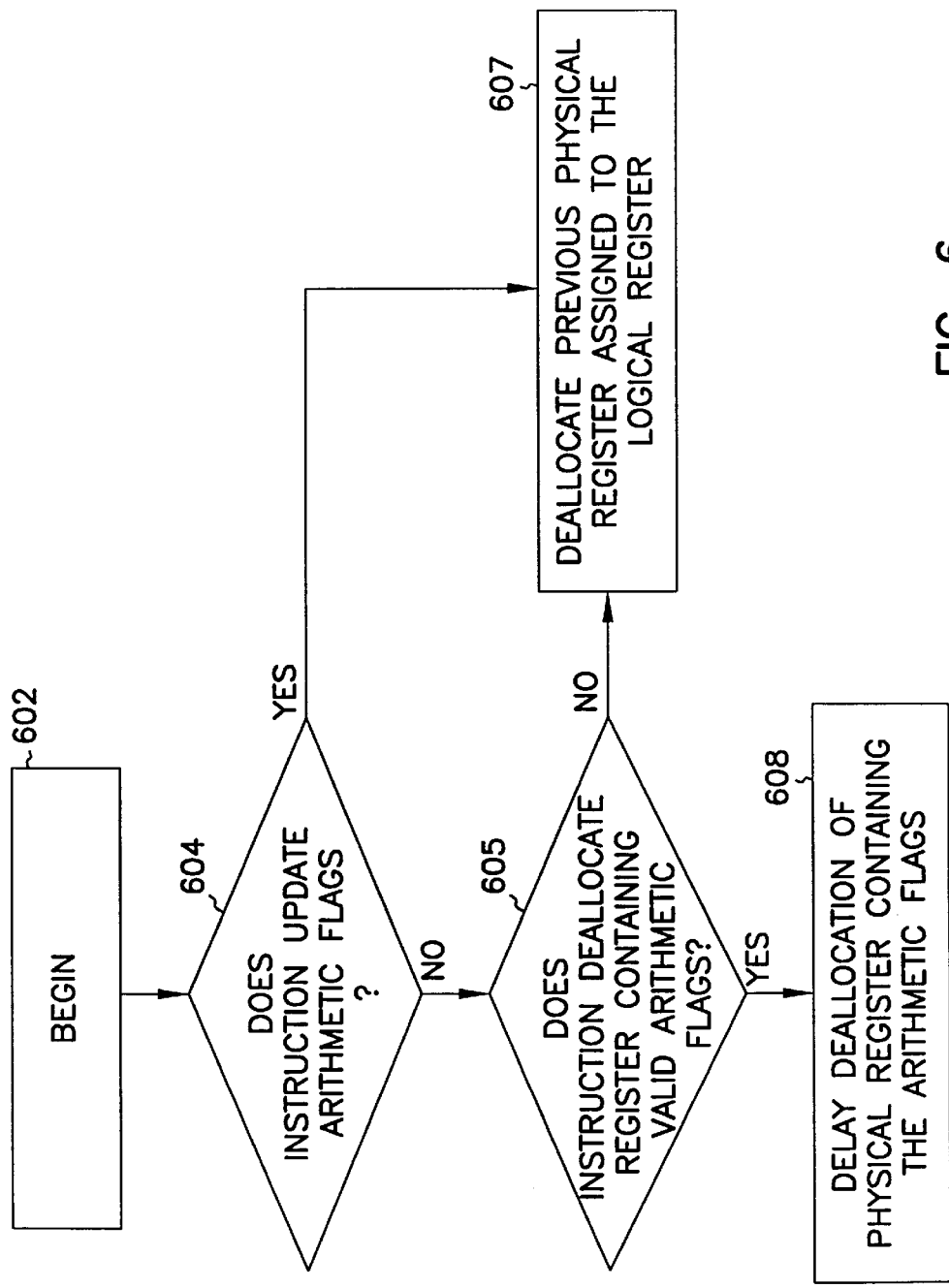
FIG. 6 is a flow chart of an embodiment of a method of managing registers according to the present invention.

Method Embodiments. FIG. 6 is a flow chart of an embodiment of a method of managing registers according to the present invention. In one embodiment, the method shown in FIG. 6 begins when an instruction is renamed (block 602). The instruction is examined to determine if the instruction updates the arithmetic flags register (block 604). If the instruction updates the arithmetic flags, the physical destination register to be deallocated upon retirement is the previous register assigned to the logical destination register for the instruction being retired (block 607). If the instruction does not update the arithmetic flags, then the instruction is checked to see if retirement of the instruction will deallocate the register containing the valid arithmetic flags (block 605). If retirement of the instruction does not deallocate the register containing the valid arithmetic flags, then the physical destination register to be deallocated upon retirement of the instruction is the previous register assigned to the logical destination register for the instruction (block 607). If retirement of the instruction will deallocate the register containing the valid arithmetic flags, then deallocation of the physcial register containing the arithmetic flags is delayed according to the present invention (block 608).

Data Flow Examples. FIGS. 7A, 7B, 7C, 7D, 7E, 7F, 7G, 7H, 7I, and 7J illustrate a data flow example for an example sequence of instructions that perform operations on logical registers. The example sequence of instructions includes instructions that explicitly update the arithmetic flags, implicitly update the arithmetic flags, and leave the arithmetic flags unaffected. As described above, the affect of an instruction on the arithmetic flags determines whether or not to delay the deallocation of a physical register containing a current state of the arithmetic flags.

Figure 7A:
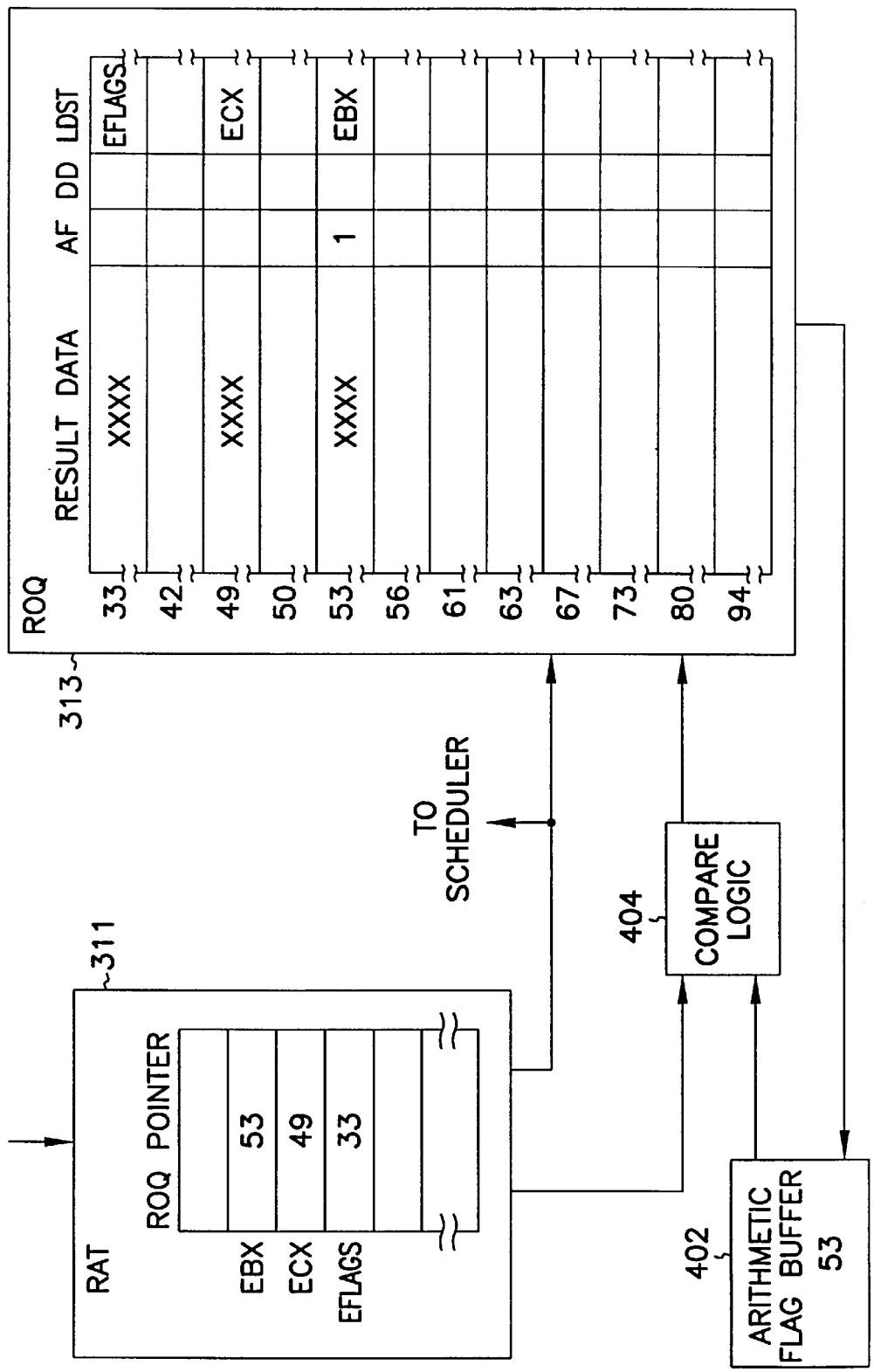

As shown in FIG. 7A, the RAT 311 initially maps the logical register EBX to a physical register "53" in the ROQ 313. The RAT 311 also maps the logical register ECX to a physical register "49" and the EFLAGS register to a physical register "33". The arithmetic flags buffer indicates the current state of the arithmetic flags (AFLAGS) is in a physical register "53".

Figure 7B:
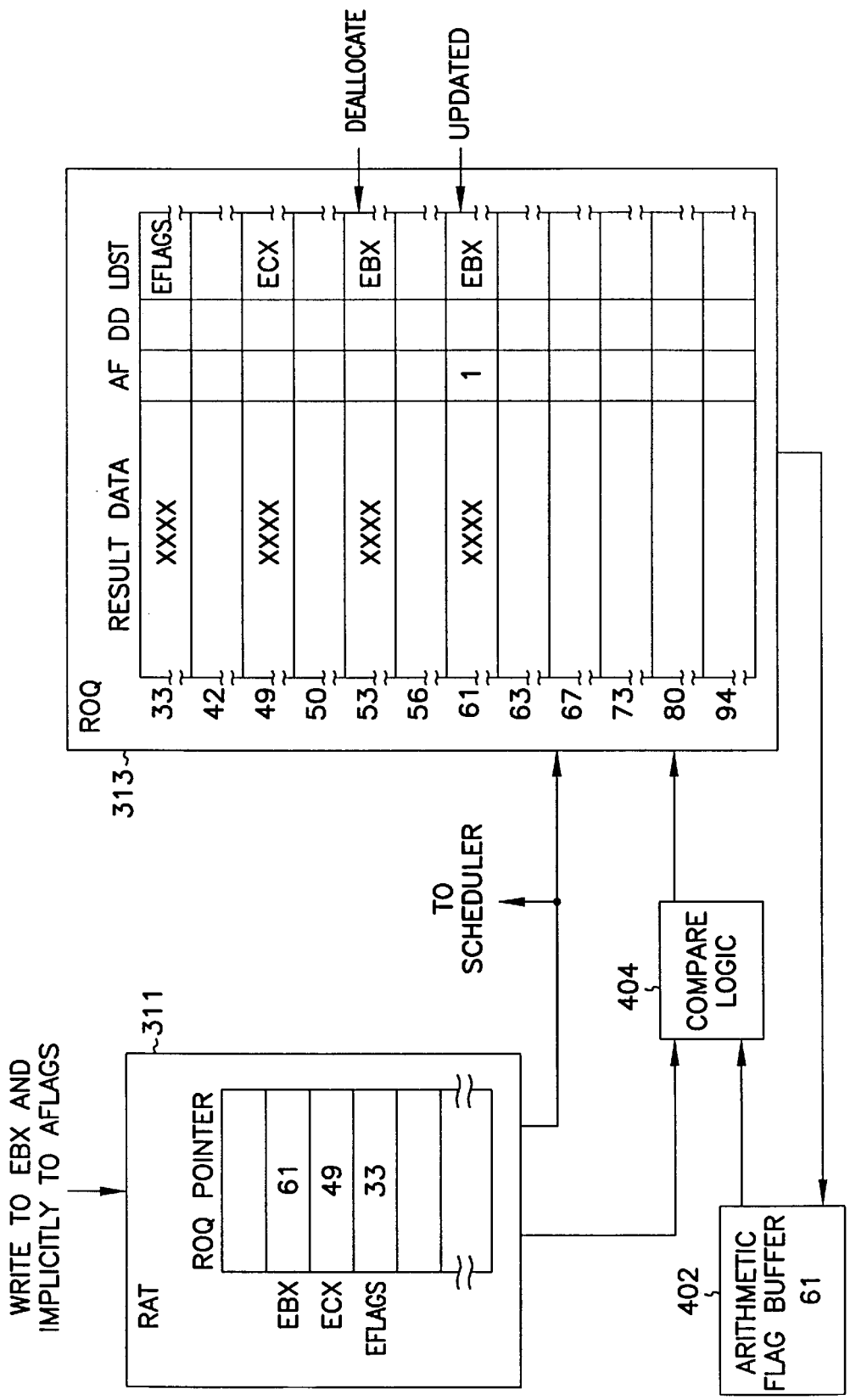

FIGS. 7B, 7C, 7D, 7E, 7F, 7G, 7H, 7I, and 7J show the architectural state of the RAT 311, the ROQ 313, and the arithmetic flag buffer 402 after the retirement of each of nine example instructions. As shown in FIG. 7B, instruction one is an operation which writes into EBX and implicitly updates the arithmetic flags. As a result, on the retirement of this instruction one, the arithmetic flags buffer points to physical register "61" as the current state of the arithmetic flags. Because instruction one implicitly updates the arithmetic flags, the arithmetic flags share the same physical register as the logical destination register EBX. Thus, the RAT entry for EBX also points to physical register "61". The AF bit for physical register "61" indicates that the register contains arithmetic flags. No delayed deallocation is performed because the instruction implicitly updated the arithmetic flags. The old physical destination register for EBX (physical register "53") is deallocated.

Figure 7C:
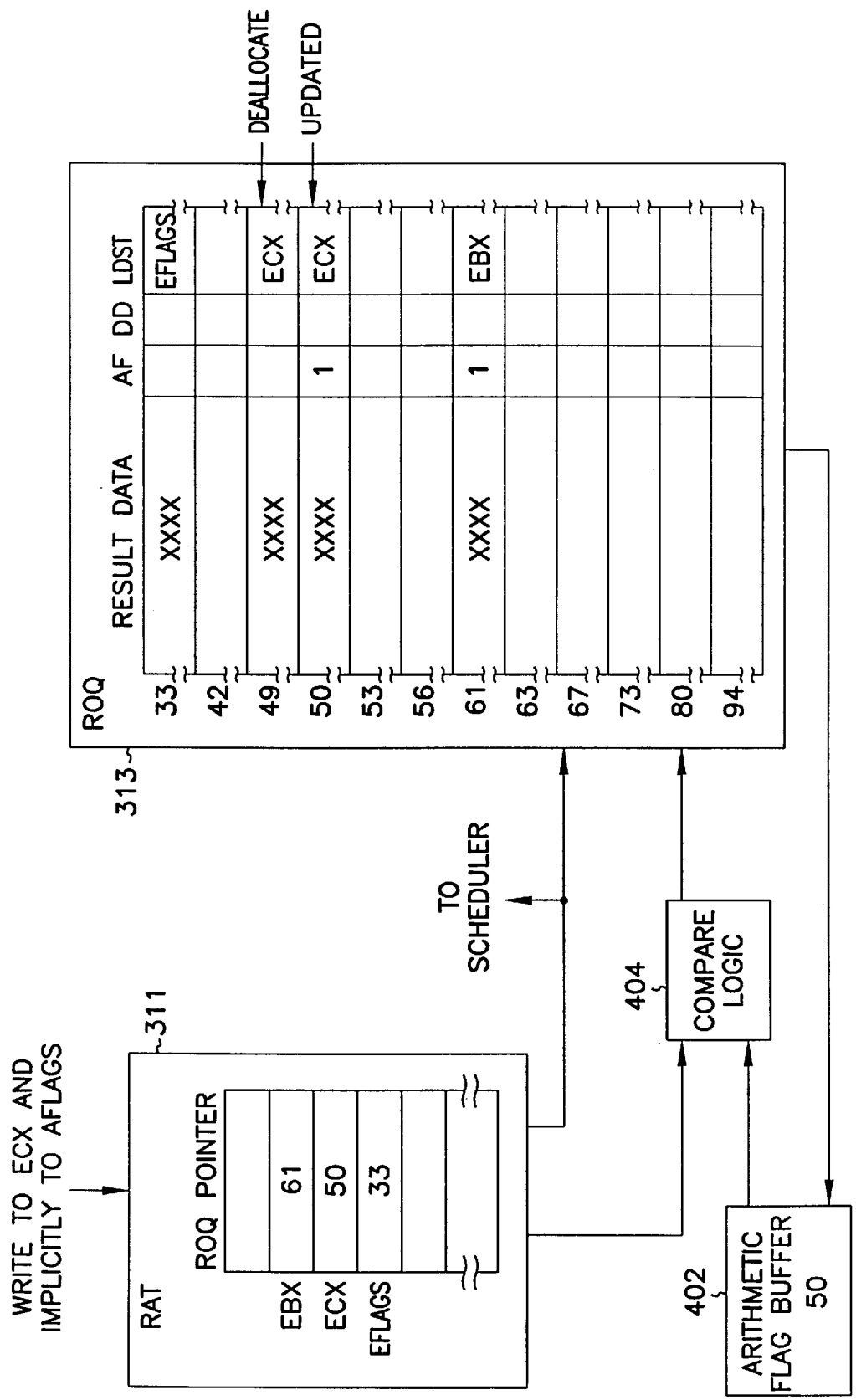

As shown in FIG. 7C, instruction two is an operation which writes into ECX and implicitly into the arithmetic flags. As a result, on the retirement of this instruction two, the arithmetic flags buffer points to physical register "50" as the current state of the arithmetic flags. Because instruction two implicitly updates the arithmetic flags, the arithmetic flags share the same physical register as the logical destination register ECX. Thus, the RAT entry for ECX also points to physical register "50". The AF bit for physical register "50" indicates that the register contains arithmetic flags. Again, because this instruction implicitly updates the arithmetic flags, the deallocation of the previous physical destination register for ECX is not delayed. So, the old physical destination register for ECX (physical register "49") is deallocated.

Figure 7D:
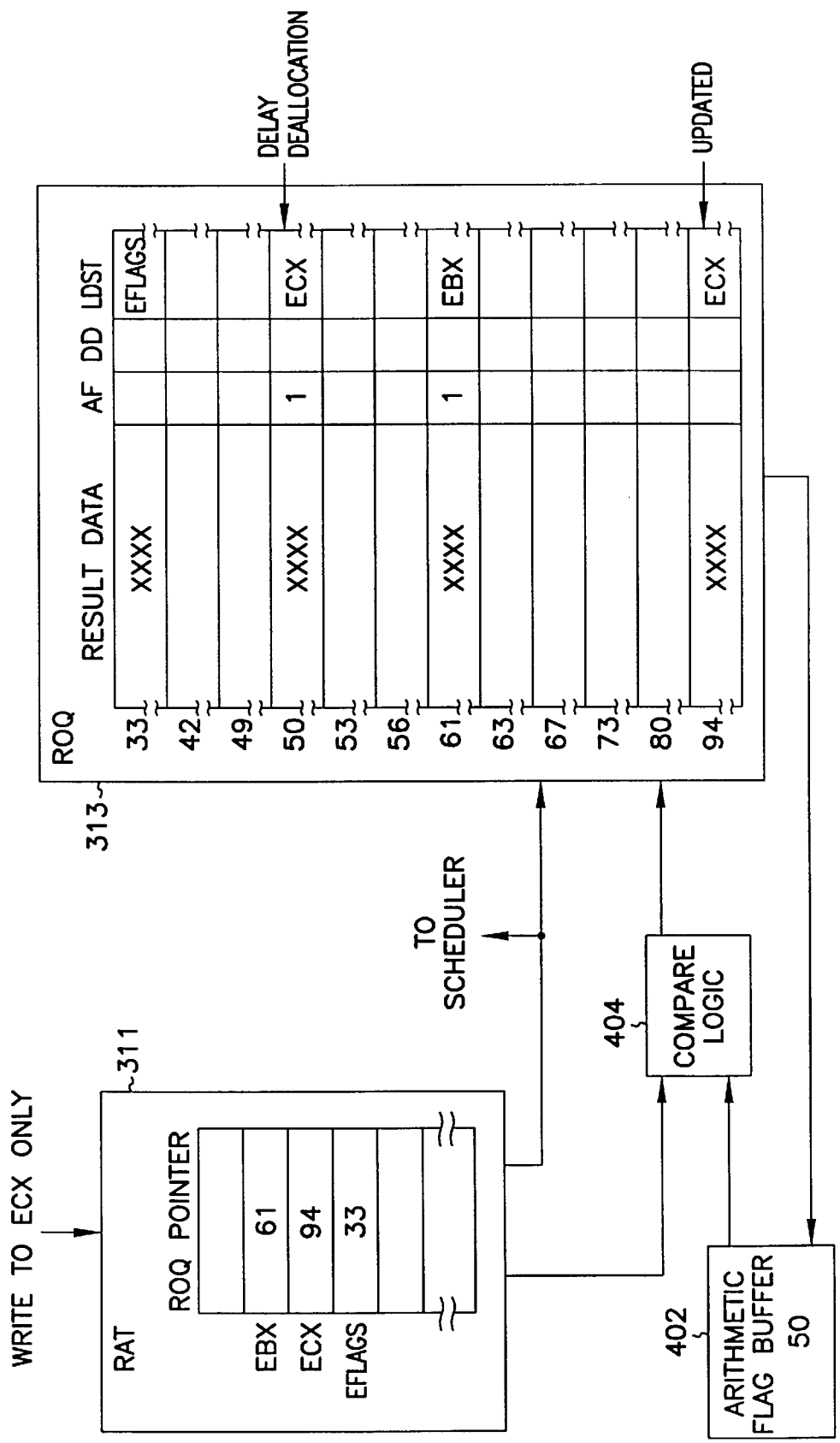

As shown in FIG. 7D, instruction three is an operation which writes into ECX, but does not update the arithmetic flags. As a result, on the retirement of this instruction three, the RAT entry for ECX points to physical register "94" but the arithmetic flags are unchanged and remain in physical register "50" as indicated by the arithmetic flag buffer 402. In previous systems, retirement of instruction three would deallocate the physical register "50" because it contains the previous value for the logical register ECX. However, because physical register "50" still contains the current state of the arithmetic flags, deallocation of the physical register "50" is delayed according to the present invention. The DD bit for physical register 94 indicates that deallocation of the arithmetic flags is to be delayed. The physical register "50" is preserved and instead, whatever physical register had been delayed previously is deallocated.

Figure 7E:
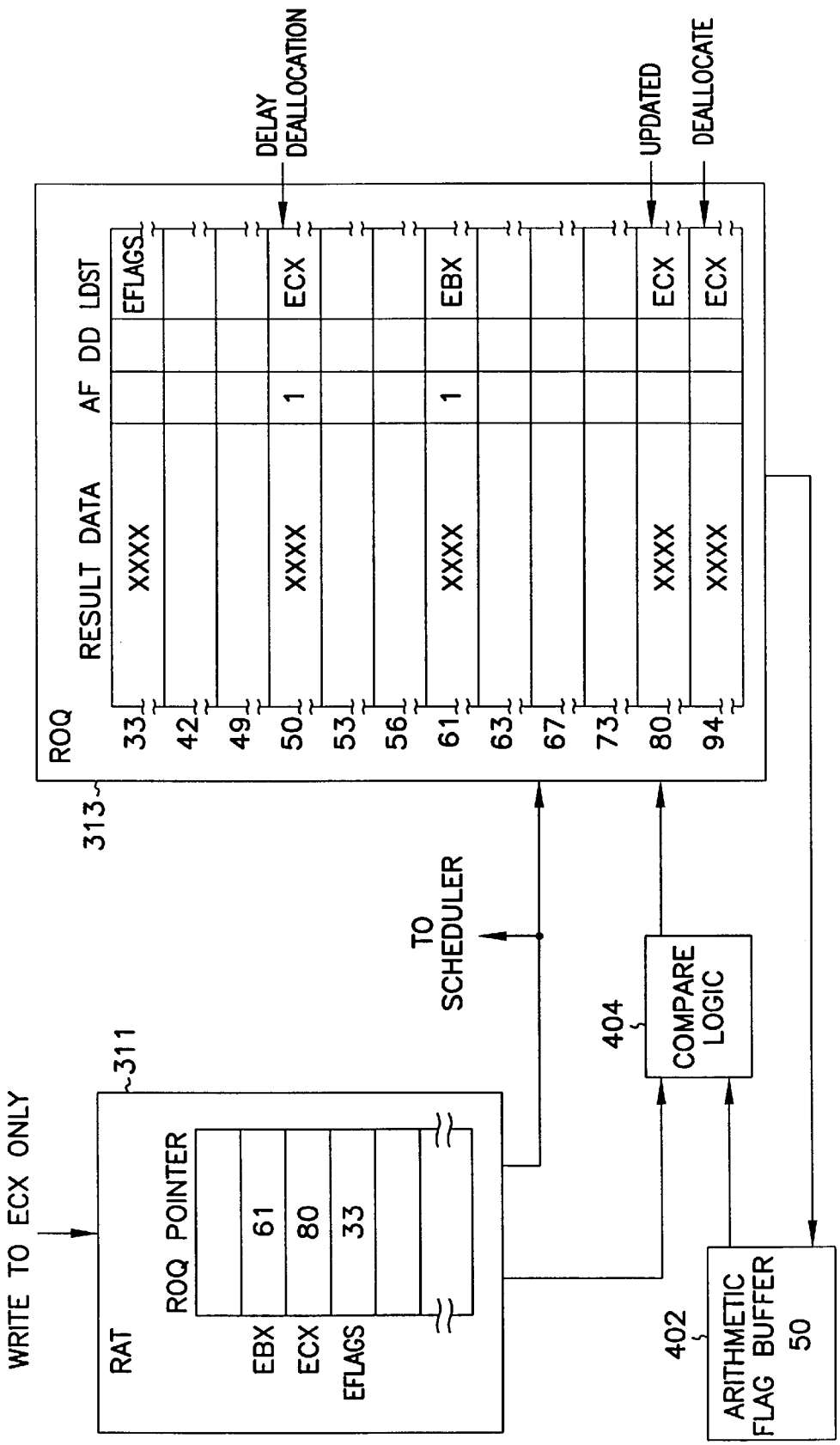

As shown in FIG. 7E, instruction four performs another write into ECX without updating the arithmetic flags. This time, on the retirement of instruction four, the RAT entry for ECX now points to the physical register "80". The arithmetic flags buffer 402 still points to physical register "50" as containing the current state of the arithmetic flags. In this case, retirement of instruction four deallocates the physical register "94" because it contains the previous value for the logical register ECX. Since the physical register "94" does not contains the current state of the arithmetic flags, the physical register "94" is deallocated. Although instruction four did not update the arithmetic flags, the delayed deallocation mechanism of the present invention is not triggered by instruction four because the retirement of instruction four does not deallocate the physical register containing the arithmetic flags (i.e. physical register "50").

Figure 7F:
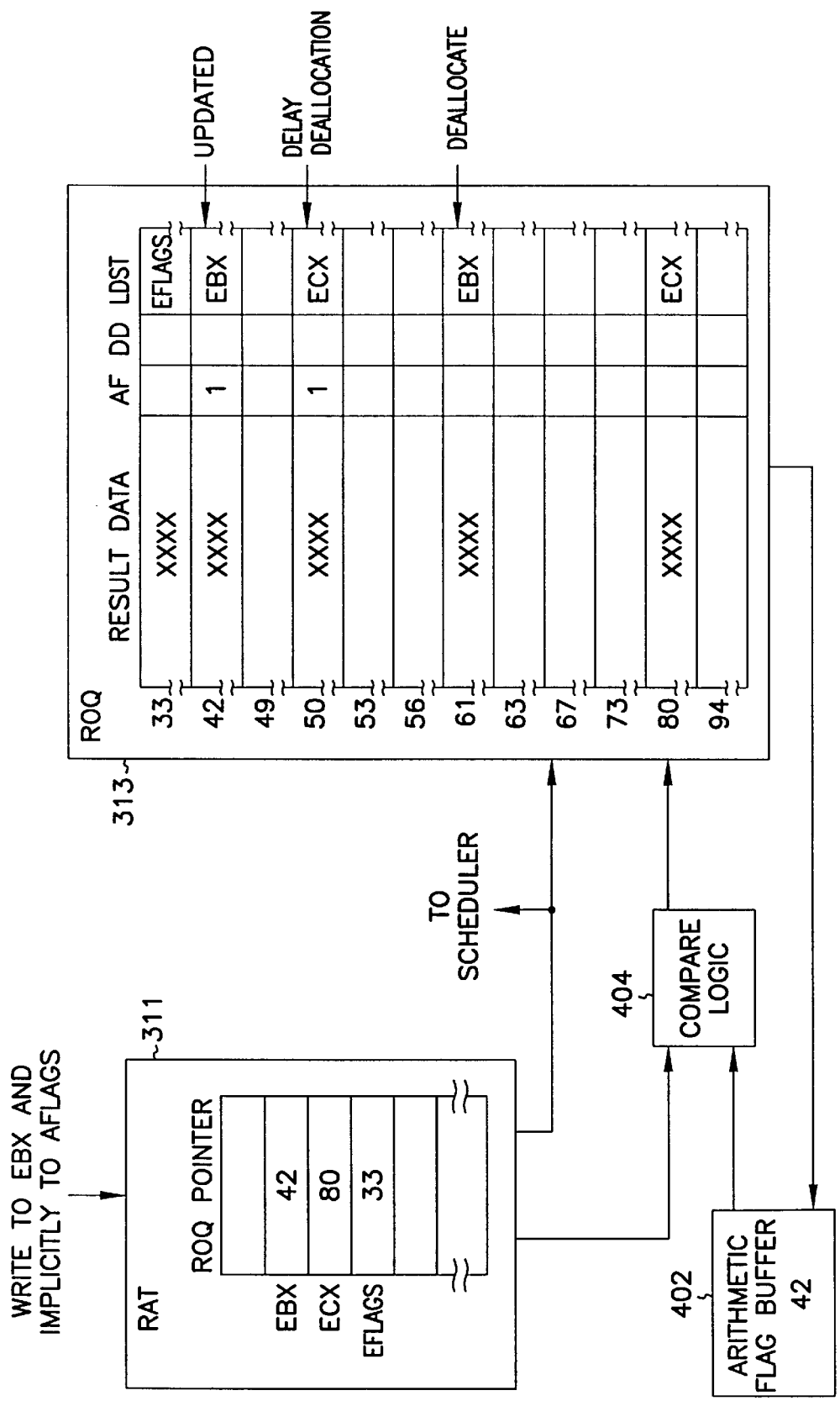

As shown in FIG. 7F, instruction five performs a write into EBX and an implicit write into the arithmetic flags register. On retirement of this instruction five, EBX's RAT entry for the logical register EBX now points to physical register 42. The arithmetic flag buffer now also points to physical register "42" because the implicitly updated arithmetic flags are stored in the same physical register as the logical register EBX. The AF bit for physical register "42"

indicates that the register contains arithmetic flags. Since an implicit write occurred, the register deallocated is the old physical destination register for EBX which is physical register "61".

Figure 7G:
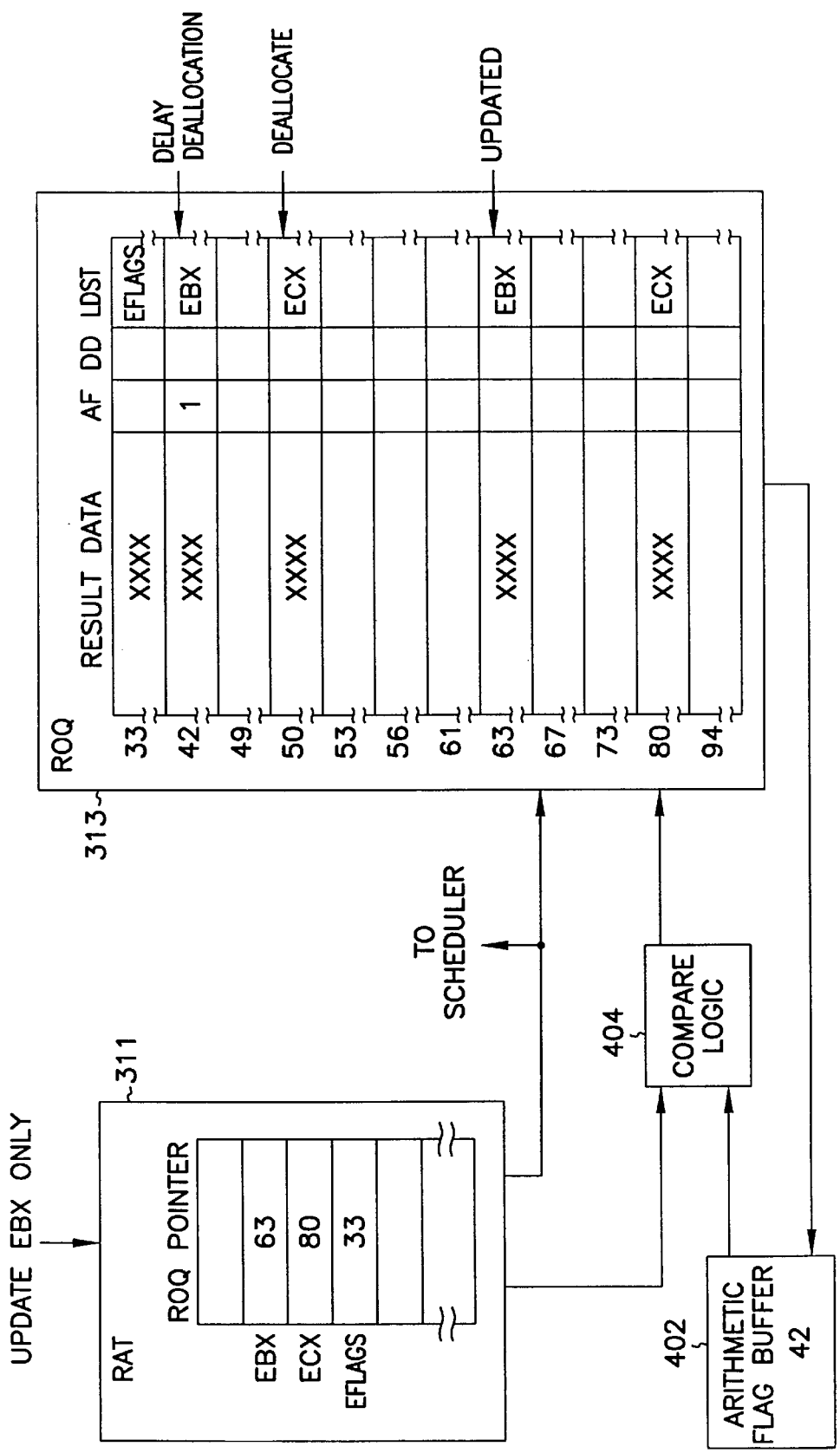

As shown in FIG. 7G, instruction six performs a write into EBX but does not update the arithmetic flags. On retirement of this instruction six, the RAT entry for EBX points to physical register "63". Because this instruction six did not write to the arithmetic flags, the arithmetic flags remain in the same physical register as they were in upon the retirement of instruction five and the arithmetic flag buffer 402 still points to physical register "42" as containing the current state of the arithmetic flags. Similar to instruction three, retirement of instruction six would deallocate the physical register "42" because it contains the previous value for the logical register EBX. However, because physical register "42" still contains the current state of the arithmetic flags, deallocation of the physical register "42" is delayed according to the present invention. The DD bit for physical register 63 indicates that deallocation of the arithmetic flags is to be delayed. The physical register "42" is preserved and, instead, the previously delayed physical register "50" is deallocated.

Figure 7H:
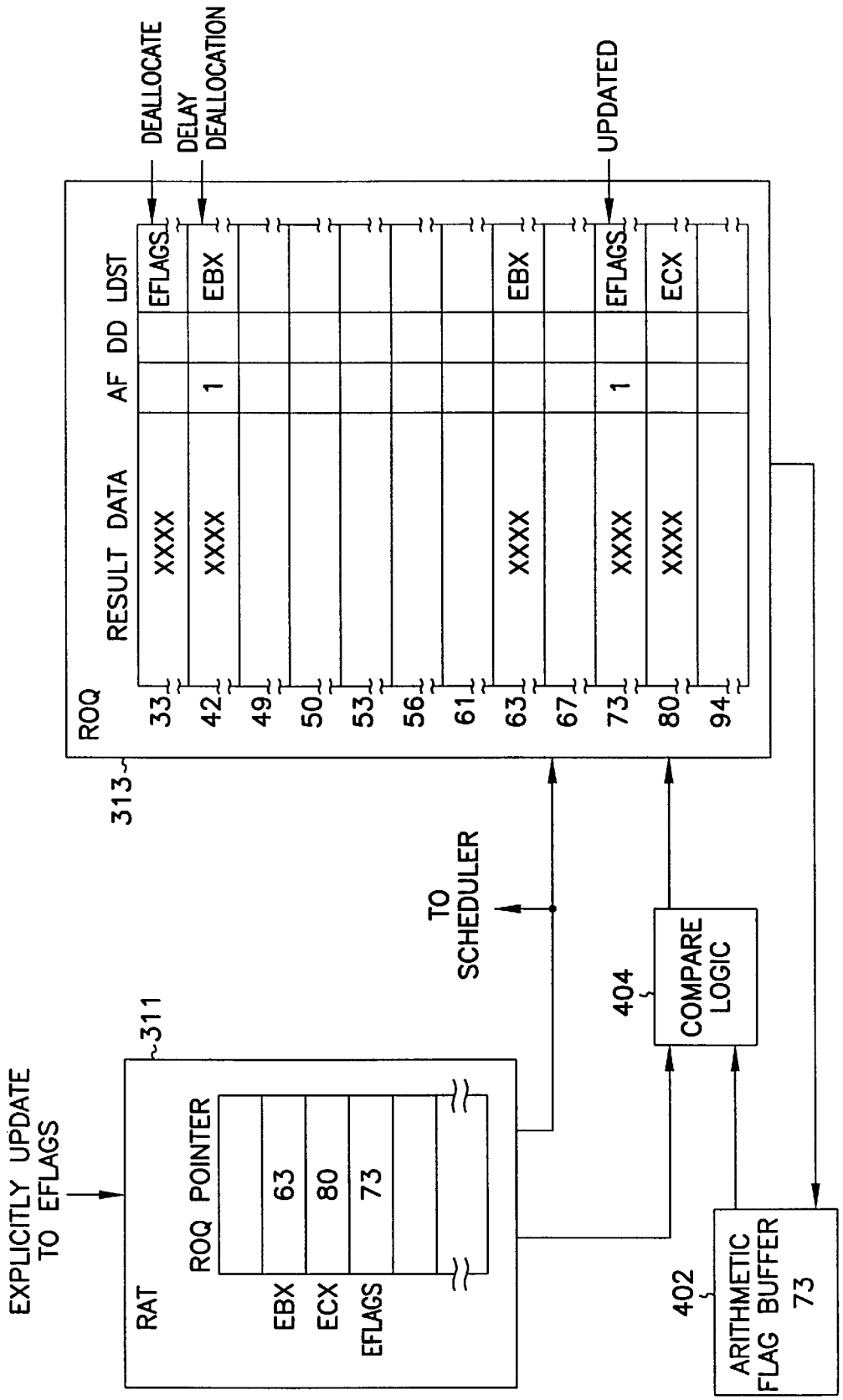

As shown in FIG. 7H, instruction seven performs an explicit updated to the arithmetic flags. On retirement of this instruction seven, the RAT entry for the EFLAGS points to physical register "73" and so does the arithmetic flag buffer. The AF bit for physical register "73" indicates that the register contains arithmetic flags. The old physical register "33" of EFLAGS is deallocated.

As shown in FIG. 7I, instruction eight performs a write into EBX and an implicit write into the arithmetic flags. On retirement of this instruction eight, both the RAT entry for EBX and the arithmetic flag buffer 402 point to physical register "56". The AF bit for physical register "56" indicates that the register contains arithmetic flags. Since this was an implicit write to the arithmetic flags, no delayed deallocation is needed and the old physical register "63" for EBX is deallocated.

Figure 7J:
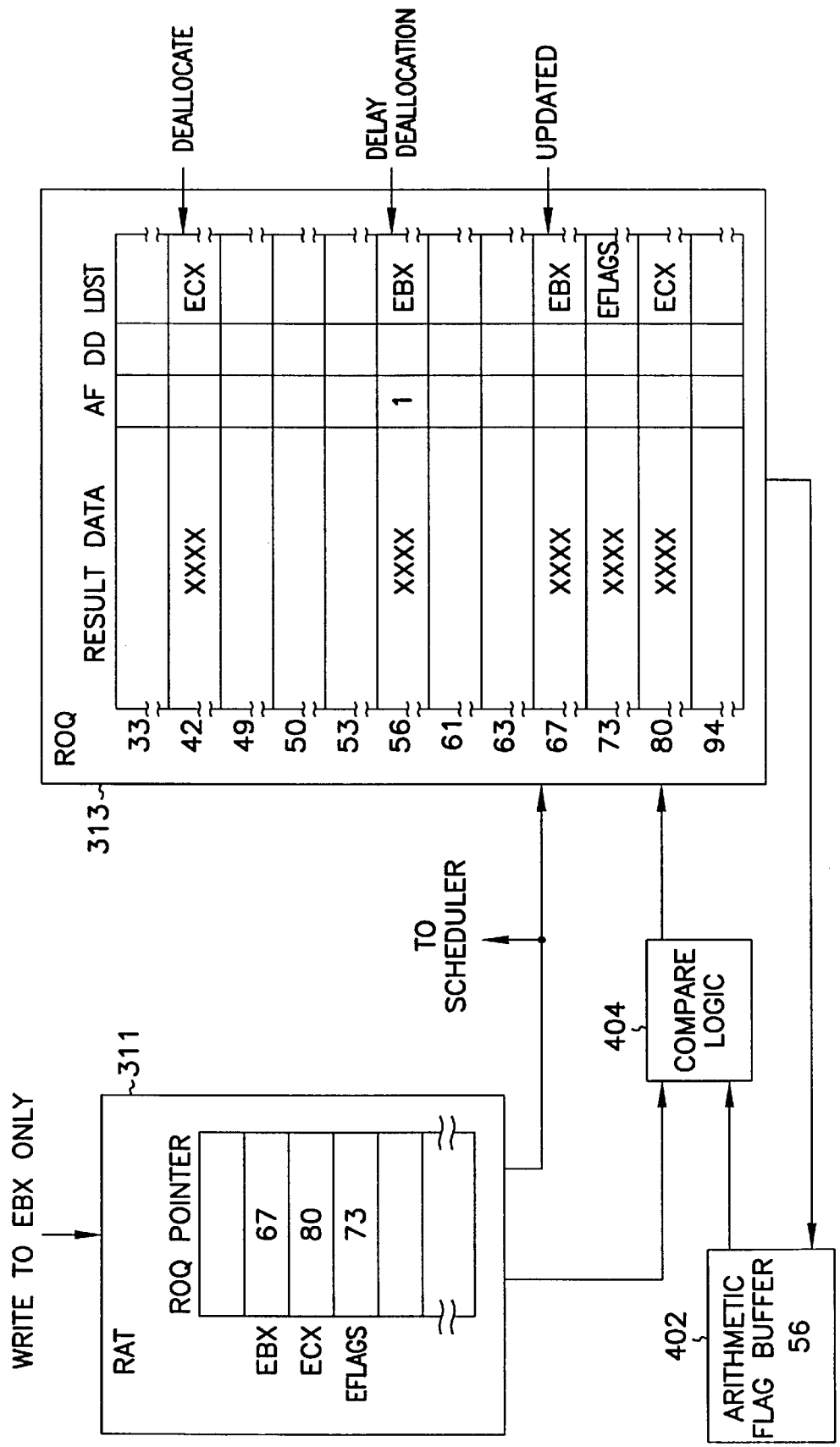

As shown in FIG. 7J, instruction nine performs a write into EBX but does not affect the arithmetic flags. On retirement of this instruction nine, RAT entry for EBX points to physical register "67". However, instruction nine does not affect the arithmetic flags, the arithmetic flags buffer 402 still points to physical register "56". Similar to instruction three and instruction six, retirement of instruction nine would deallocate the physical register "56" because it contains the previous value for the logical register EBX. However, because physical register "56" still contains the current state of the arithmetic flags, deallocation of the physical register "56" is delayed according to the present invention. The DD bit for physical register "67" indicates that deallocation of the arithmetic flags is to be delayed. The physical register "56" is preserved and, instead, the previously delayed physical register "42" is deallocated.

FIG. 8 is a table summarizing the sequence of instructions shown in FIGS. 7A, 7B, 7C, 7D, 7E, 7F, 7G, 7H, 7I, and 7J.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method of delaying the deallocation an arithmetic flags register, the method comprising: determining if an instruction updates the arithmetic flags register; deallocating a previous physical register assigned to a logical destination register for the instruction if the instruction updates the arithmetic flags register;

determining if the instruction deallocates a physical register containing the arithmetic flags when the value of the arithmetic flags is unaffected by the instruction;

deallocating a previous physical register assigned to a logical destination register for the instruction if the instruction deallocates a physical register other than the physical register containing the arithmetic flags when the value of the arithmetic flags is unaffected by the instruction; and delaying deallocation of the physical register containing the arithmetic flags if the value of the arithmetic flags is unaffected by the instruction and the instruction deallocates the physical register containing the arithmetic flags wherein delaying deallocation of the previous physical register preserves the arithmetic flags.

2. The method of claim 1, further comprising setting an entry in the physical destination register for the instruction wherein the first entry indicates that the instruction updates the arithmetic flags.

3. The method of claim 1, further comprising setting an entry in the physical destination register for the instruction wherein the entry indicates that the deallocation of the physical register containing the arithmetic flags is to be delayed.

4. The method of claim 1, wherein deallocation of the physical register containing the arithmetic flags is delayed until a subsequent instruction updates the arithmetic flags.

5. A microprocessor comprising:

a data dependency unit for renaming a logical register to a larger set of physical registers;

an instruction retirement unit for indicating if a physical register contains a current state of arithmetic flags and for indicating if deallocation of the physical register containing the current state of the arithmetic flags is to be delayed.

6. The microprocessor of claim 5, wherein the data dependency unit comprises a register alias table.

7. The microprocessor of claim 5, wherein the data dependency unit further comprises an arithmetic flag buffer containing a pointer to the physical register containing the current state of the arithmetic flags register.

8. The microprocessor of claim 5, further comprising compare logic to compare the physical register corresponding to a logical register that is being renamed with the physical register containing the arithmetic flags wherein if the physical register is the same and the instruction leaves the arithmetic flags unaffected then deallocation of the physical register containing the arithmetic flags is delayed.

9. The microprocessor of claim 5, further comprising a buffer containing a pointer to a physical register for which the deallocation was previously delayed.

10. A computer system comprising:

a bus;

an external memory coupled to the bus; and a microprocessor coupled to the external memory and the bus, the microprocessor including:

a plurality of physical registers, each one of the physical registers having a first identifier to indicate that the physical register contains an arithmetic flags register and having a second identifier to indicate if deallocation of the physical register is to be delayed;

a register alias table for renaming logical registers and for identifying an instruction that implicitly updates the arithmetic flags register;

an arithmetic flag buffer containing a pointer to the physical register containing a current state of the arithmetic flags register;

compare logic to compare the physical register corresponding to a logical register that is being renamed with the physical register containing the arithmetic flags wherein if the physical register is the same and the instruction leaves the arithmetic flags unaffected, the second identifier is set in the physical register containing the arithmetic flags so that deallocation of the physical register is delayed.

11. The computer system of claim 10, further comprising a buffer containing a pointer to a physical register wherein the deallocation of the physical of the physical register was previously delayed.

12. An article comprising, a computer readable medium having instructions stored thereon for causing a computer to perform a method of delaying the deallocation of an arithmetic flags register, the method comprising:

determining if an instruction updates the arithmetic flags register;

deallocating a previous physical register assigned to a logical destination register for the instruction if the instruction updates the arithmetic flags register;

determining if the instruction deallocates a physical register containing the arithmetic flags when the value of the arithmetic flags is unaffected by the instruction;

deallocating a previous physical register assigned to a logical destination register for the instruction if the instruction deallocates a physical register other than the physical register containing the arithmetic flags when the value of the arithmetic flags is unaffected by the instruction; and delaying deallocation of the physical register containing the arithmetic flags if the value of the arithmetic flags is unaffected by the instruction and the instruction deallocates the physical register containing the arithmetic flags wherein delaying deallocation of the previous physical register preserves the arithmetic flags.

* * * * *

UNITED STATES PATENT AND TRADEMARK OFFICE
CERTIFICATE OF CORRECTION

PATENT NO.    : 6,253,310 B1
DATED         : June 26, 2001
INVENTOR(S)   : Ricardo Ramirez, Michael Morrison It is certified that error appears in the above-identified patent and that said Letters Patent is hereby corrected as shown below:

Column 1,
Line 16, delete "register" and insert -- registers --, therefor.

Column 2,
Line 8, delete "provided" and insert -- provide --, therefor.

Column 3,
Lines 3 and 8, delete "71" and insert -- 7I --, therefor.

Column 8,
Line 63, delete "flags ," and insert -- flags, --, therefor.

Column 9,
Lines 46 and 63, delete "71" and insert -- 7I --, therefor.

Column 10,
Line 53, delete "contains" and insert -- contain --.

Figure 71:
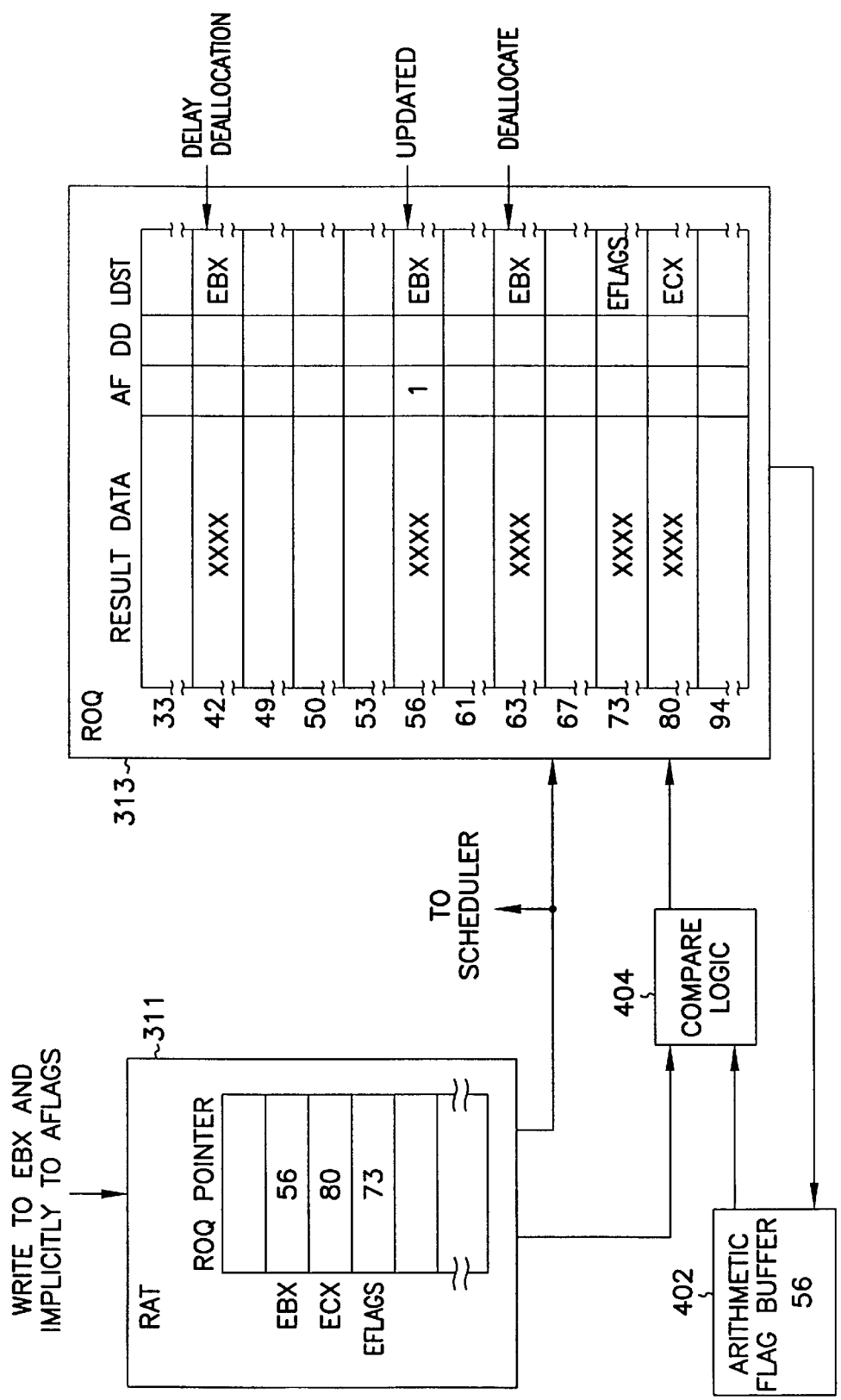

Column 11,
Line 32, delete "FIG. 71" and insert -- FIG. 7I --, therefor.
Line 58, delete "71" and insert -- 7I --, therefor.

Column 13, claim 11,
Line 19, delete "of the physical of the physical" and insert -- of the physical --, therefor.

Signed and Sealed this

Twenty-sixth Day of February, 2002

Attest:

JAMES E. ROGAN
*Attesting Officer*    *Director of the United States Patent and Trademark Office*